United States Patent
Kobayashi

(10) Patent No.: US 10,088,831 B2
(45) Date of Patent: Oct. 2, 2018

(54) NUMERICAL CONTROLLER CAPABLE OF CHECKING INTERFERENCE BETWEEN TOOL AND WORKPIECE

(71) Applicant: FANUC Corporation, Minamitsuru-gun, Yamanashi (JP)

(72) Inventor: Masanori Kobayashi, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 206 days.

(21) Appl. No.: 15/076,796

(22) Filed: Mar. 22, 2016

(65) Prior Publication Data

US 2016/0299491 A1    Oct. 13, 2016

(30) Foreign Application Priority Data

Apr. 13, 2015  (JP) ................................ 2015-081871

(51) Int. Cl.
G05B 19/4061   (2006.01)

(52) U.S. Cl.
CPC .............. *G05B 19/4061* (2013.01); *G05B 2219/35316* (2013.01); *G05B 2219/37237* (2013.01); *G05B 2219/49157* (2013.01)

(58) Field of Classification Search
CPC ...... G05B 19/4061; G05B 2219/35316; G05B 2219/37237; G05B 2219/49157
USPC ................................................. 700/178, 104
See application file for complete search history.

(56) References Cited

U.S. PATENT DOCUMENTS

| | | |
|---|---|---|
| 2008/0021591 A1 | 1/2008 | Tani et al. |
| 2011/0202167 A1* | 8/2011 | Iwashita .............. G05B 19/404 700/187 |
| 2011/0257778 A1 | 10/2011 | Takahashi et al. |

FOREIGN PATENT DOCUMENTS

| | | |
|---|---|---|
| JP | H09-69003 A | 3/1997 |
| JP | H09-150347 A | 6/1997 |
| JP | 2000-284819 A | 10/2000 |
| JP | 2008-027045 A | 2/2008 |
| WO | WO-2010/073296 A1 | 7/2010 |

OTHER PUBLICATIONS

Decision to Grant a Patent dated May 30, 2017 in Japanese Patent Application No. 2015-081871 (3 pages) with an English translation (3 pages).

* cited by examiner

*Primary Examiner* — Robert E Fennema
*Assistant Examiner* — Jigneshkumar C Patel
(74) *Attorney, Agent, or Firm* — Drinker Biddle & Reath LLP

(57) ABSTRACT

The numerical controller detects an abnormal interference between targets for interference check in a machine tool, including a tool and a workpiece, based on a machining program. The numerical controller changes a direction (contactable direction) in which the tool can contact the workpiece for machining and determines that an interference between the tool and the workpiece is abnormal if the tool compensation direction of radius compensation is not included in the changed contactable direction for the tool.

2 Claims, 10 Drawing Sheets

EXAMPLE OF SETTING OF CONTACTABLE DIRECTIONS $X \leqq 0, Y=0, Z \leqq 0$

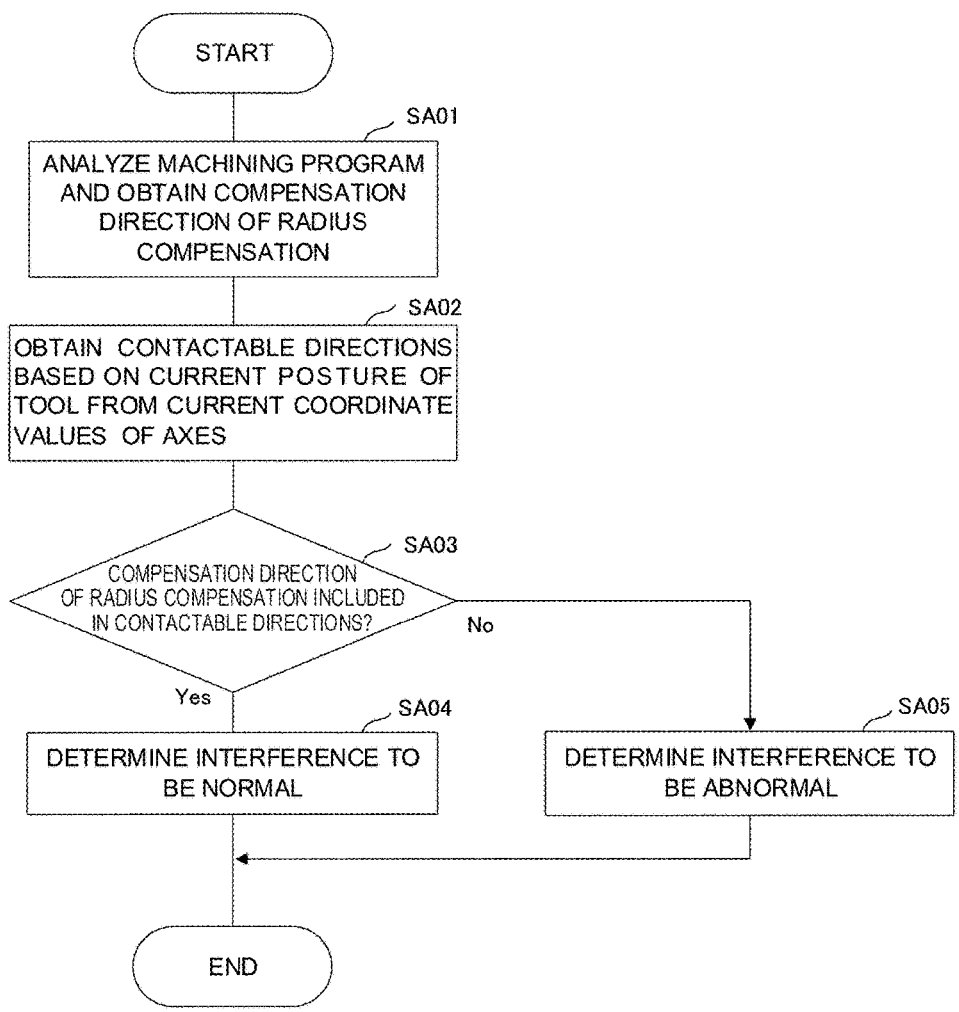

NUMERICAL CONTROLLER CAPABLE OF CHECKING INTERFERENCE BETWEEN TOOL AND WORKPIECE

RELATED APPLICATION DATA

This application claims priority under 35 U.S.C. § 119 and/or § 365 to Japanese Application No. 2015-081871 filed Apr. 13, 2015, the entire contents is incorporated herein by reference.

BACKGROUND OF THE INVENTION

Field of the Invention

The present invention relates to a numerical controller, and more particularly, to a numerical controller capable of detecting abnormal interference between a tool and a workpiece.

Description of the Related Art

According to a prior art technique for detecting interference between structures, tool, and workpiece in a machine tool, the three-dimensional shapes of the target for interference check are typically represented by a combination of three-dimensional models, such as cuboids and columns, and interference between these three-dimensional models is checked.

One such prior art technique for interference detection is disclosed in Japanese Patent Application Laid-Open No. 2000-284819, for example. This technique is based on a viewpoint that a tool 2 roughly comprises two portions, that is, a blade portion 3 that contacts a workpiece (not shown) to machine it and a portion 4 other than the blade portion, as shown in FIG. 8A (turning tool) or 8B (milling tool). Since machining cannot be performed if the blade portion 3 of the tool 2 is assumed to be a target for interference check, the blade portion 3 is excluded from target for interference check, and the portion 4 of the tool 2 other than the blade portion is regarded as the target for interference check.

Also proposed are techniques for detecting abnormal interference between a workpiece and a blade portion. According to techniques disclosed in Japanese Patent Applications Laid-Open Nos. 2008-027045 and 09-150347 and International Publication No. 2010/073296, for example, a movement direction for machining is previously defined for each tool so that it can be determined that an interference between a blade portion of the tool and a workpiece during movement in a direction in which machining can be performed is normal whereas an interference between a blade portion of the tool and a workpiece during movement in a direction other than a direction in which machining can be performed is abnormal.

Even when a blade portion of a tool and a workpiece interfere with each other while the tool is moving in a direction in which machining can be performed, however, abnormal interference may possibly occur depending on the positional relationship between the tool and the workpiece. Accordingly, there is a problem in that such an abnormal interference cannot be detected by the above-described prior art techniques.

If only a machining part at the distal end of a blade portion 3 of a turning tool 2 interferes with a workpiece 5 while the tool 2 is moving in a movement direction M in which machining can be performed, as shown in FIG. 9A, for example, this interference can be considered to be normal. If any part other than the machining part of the blade portion 3 of the tool 2 interferes with the workpiece 5 although the tool 2 is moving in the movement direction M in which machining can be performed, as shown in FIG. 9B, however, the interference between the blade portion 3 and the workpiece 5 can be considered to be abnormal. However, these situations cannot be detected by any of the above-described prior art techniques. In FIGS. 9A and 9B, reference numeral 6 denotes a chuck for holding the workpiece 5.

If a rotary tool 2 such as a milling tool shown in FIG. 10 is used, a rotating peripheral edge in a blade portion 3 of the rotary tool 2 moves at a predetermined speed as the tool 2 rotates. Therefore, the workpiece 5 can be machined by causing the rotating peripheral edge of the rotary tool 2 to interfere with the workpiece 5, as shown in FIG. 11A. Since the peripheral speed is zero in the vicinity of a rotation center portion of the rotary tool 2, however, the workpiece 5 cannot be machined even if the rotation center portion is made to interfere with the workpiece 5, as shown in FIG. 11B. Since the workpiece 5 cannot be machined when it interferes with the rotation center portion of the blade portion 3, therefore, the interference between the blade portion 3 and the workpiece 5 can be considered to be abnormal. However, this situation cannot be detected by any of the above-described prior art techniques.

Further, a blade portion of a tool is rounded. Since the center position of the round shape of the tool is normally commanded in a machining program, a numerical controller has a function of compensating for the difference (which is equal to the radius of the round shape) between the center position of the round shape of the blade portion and the position in which the tool contacts the workpiece. For milling tools, tool radius compensation is performed, and for turning tools, a tool nose radius compensation is performed. In the description to follow, the above two compensation functions will be collectively referred to as "radius compensation".

SUMMARY OF THE INVENTION

Accordingly, the object of the present invention is to provide a numerical controller capable of detecting abnormal interference between a tool and a workpiece.

A numerical controller according to the present invention has a function of detecting abnormal interference between target for interference check of a machine tool, including a tool and a workpiece, based on a machining program. The numerical controller includes: a contactable direction setting unit for setting a contactable direction which is a direction in which the tool is allowed to contact the workpiece so as to be able to machine the workpiece; a compensation direction analysis unit for analyzing the machining program to obtain a compensation direction of radius compensation; a contactable direction changing unit configured to change the contactable direction for the tool based on a posture of the tool; and an interference check unit configured to execute an interference check process for detecting an abnormal interference between the tool and the workpiece, based on the compensation direction of radius compensation obtained by the compensation direction analysis unit and the contactable direction changed by the contactable direction changing unit. The interference check unit determines that the interference between the tool and the workpiece is abnormal if the compensation direction of radius compensation is not included in the changed contactable direction for the tool.

The contactable direction may be set for each type of tool.

Additionally applying the method of interference check according to the present invention to conventional numerical controllers, it is possible to determine an interference between a blade portion of a tool and a workpiece more accurately and to prevent an occurrence of an abnormal interference effectively.

BRIEF DESCRIPTION OF THE DRAWINGS

The above and other objects and features of the present invention will be obvious from the ensuing description of embodiments with reference to the accompanying drawings, in which:

FIG. 7 is a flowchart showing processing for detecting abnormal interference between a blade portion of a tool and a workpiece, which is executed by the numerical controller of FIG. 6;

DETAILED DESCRIPTION OF THE PREFERRED EMBODIMENTS

The present invention provides a numerical controller with an interference check function, wherein, based on contactable directions in which the tool can contact the workpiece and a compensation direction of radius compensation obtained by analyzing a machining program, interference between a workpiece and a tool used for machining is determined to be normal if a compensation direction of radius compensation is included in such contactable directions, whereas interference between a workpiece and a tool used for machining is determined to be abnormal if a compensation direction of radius compensation is not included in such contactable directions.

The "contactable directions" are directions in which a machining part of a tool blade portion can contact a workpiece for machining and are previously defined for each tool as directions viewed from (a blade portion of) the tool. If the axes of a machine tool are controlled so that the posture of (the blade portion of) the tool is changed, the contactable directions are also changed according to the changed tool posture.

Figure 1A:
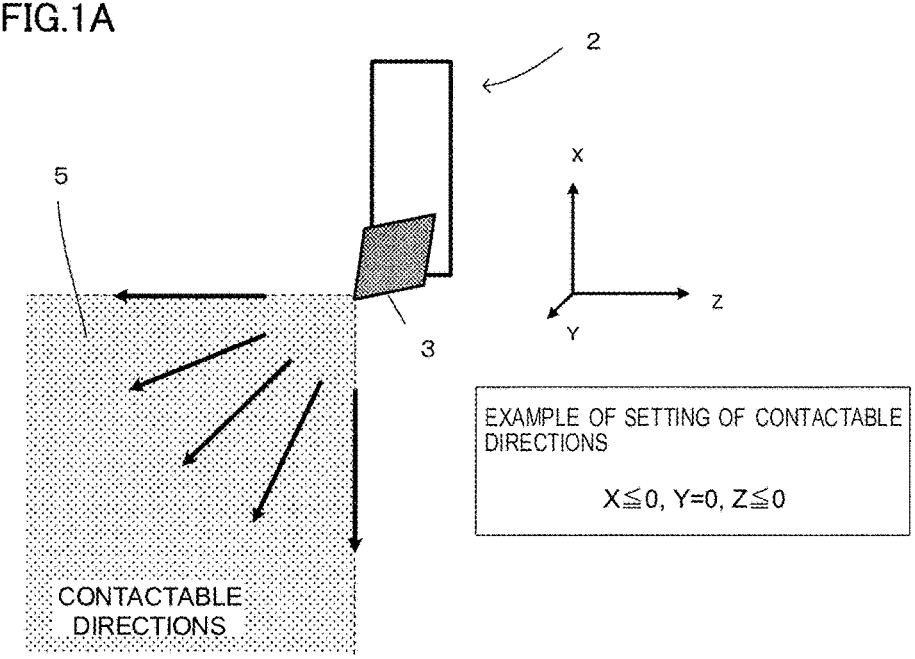
FIGS. 1A and 1B are diagrams illustrating contactable directions of a turning tool relative to a workpiece in which the turning tool can contact the workpiece.
Figure 1B:
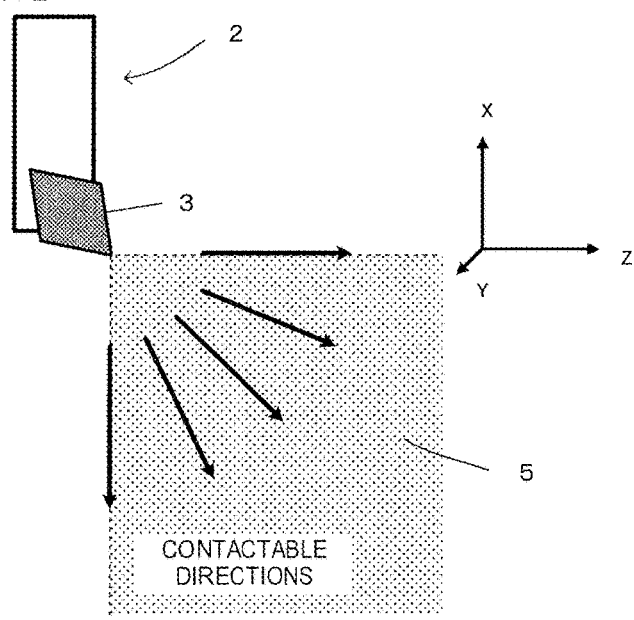

For example, the contactable directions for a turning tool 2 mounted on a coordinate axis of the machine tool, with respect to a workpiece 5, as shown in FIG. 1A, are set within a range defined by $X \leq 0$, $Y=0$, and $Z \leq 0$ based on the tool 2 (blade portion 3). If the axes of the machine tool are controlled so that the turning tool 2 is reoriented as shown in FIG. 1B, moreover, the contactable directions are set within a range defined by $X \leq 0$, $Y=0$, and $Z \geq 0$ according to the posture of the tool 2.

Figure 2A:
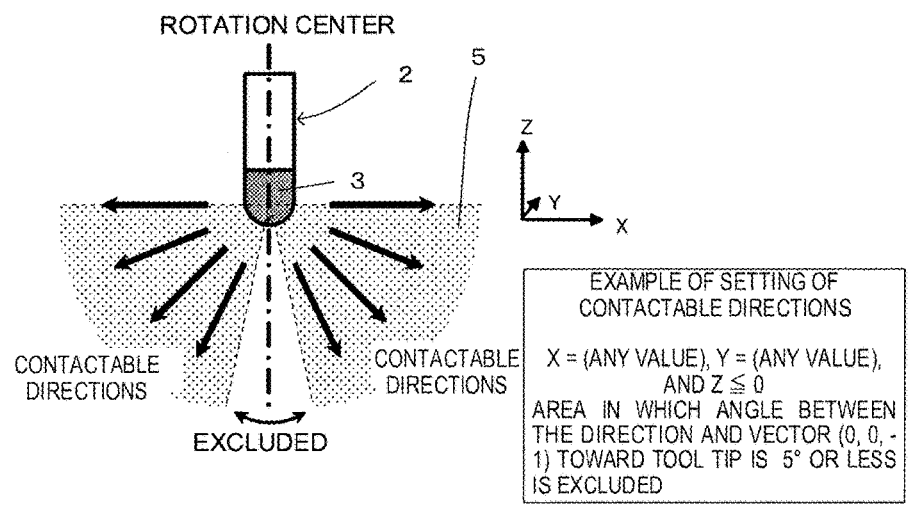
FIGS. 2A and 2B are diagrams illustrating contactable directions of a milling tool relative to a workpiece in which the milling tool can contact the workpiece.

Further, the contactable directions for a milling tool 2 mounted on the coordinate axis of the machine tool, as shown in FIG. 2A, are set within a range defined by X=(any value), Y=(any value), and $Z \leq 0$ based on the tool 2 (blade portion 3) and exclusive of an area in which the angle between the direction and a vector (0, 0, −1) toward the tool tip is, for example, 5° or less.

Figure 2B:
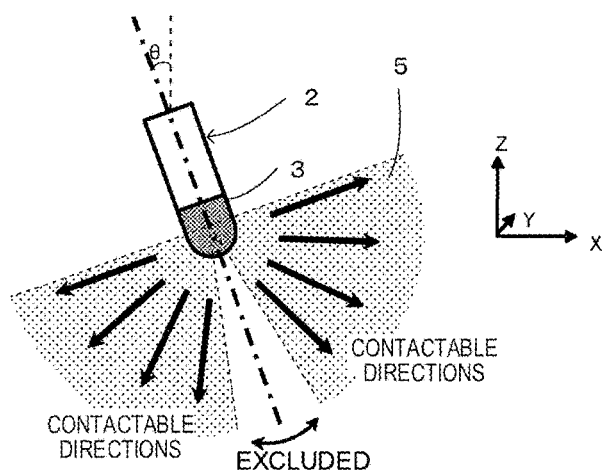

If the axes of the machine tool are controlled so that the milling tool is inclined at an angle θ on an XZ-plane, as shown in FIG. 2B, moreover, the contactable directions in which the tool 2 (blade portion 3) can contact a workpiece 5 are set within a range defined by $Z \leq X \times \tan \theta$ and Y=(any value), according to the posture of the tool 2, and exclusive of an area in which the angle between the direction and a vector (sin θ, 0, −cos θ) toward the tool tip is 5° or less.

The contactable directions in which the tool 2 can contact the workpiece 5 vary depending on the shape of the tool 2 and the machining method, as illustrated above. Alternatively, the contactable directions can be defined for each of various tools 2, such as a drilling tool (generally based on a −Z-axis direction as a contactable direction) of a plain milling cutter (generally based on a contactable direction within a predetermined angle with respect to an XY-plane), according to the shape of the tool 2 and the machining method.

The following is a description of compensation direction of radius compensation. Normally, a path (machining program path) commanded by the machining program represents the final shape of the workpiece 5. Normally, moreover, the numerical controller controls the position of the radius center of the tool 2. If the tool center is moved along the machining program path, therefore, the size of the workpiece 5 is inevitably reduced by a margin corresponding to the tool radius, so that the tool position is compensated for in consideration of the tool radius. This is the radius compensation generally performed in the numerical controller.

Figure 3:
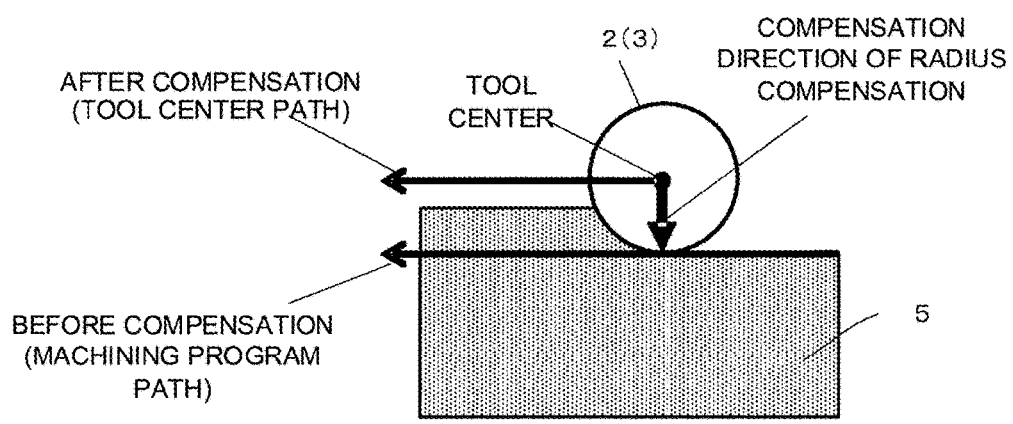
FIG. 3 is a diagram illustrating a compensation direction of radius compensation based on a tool center path and a machining program path.

FIG. 3 is a schematic diagram showing the compensation direction of radius compensation.

In the present invention, as shown in FIG. 3, the compensation direction of radius compensation is defined as a direction that connects a position after compensation (tool center path) and a position before compensation (machining program path). If the compensation direction of radius compensation is included in the contactable directions, the interference is determined to be normal. If not, the interference is determined to be abnormal.

Figure 4A:
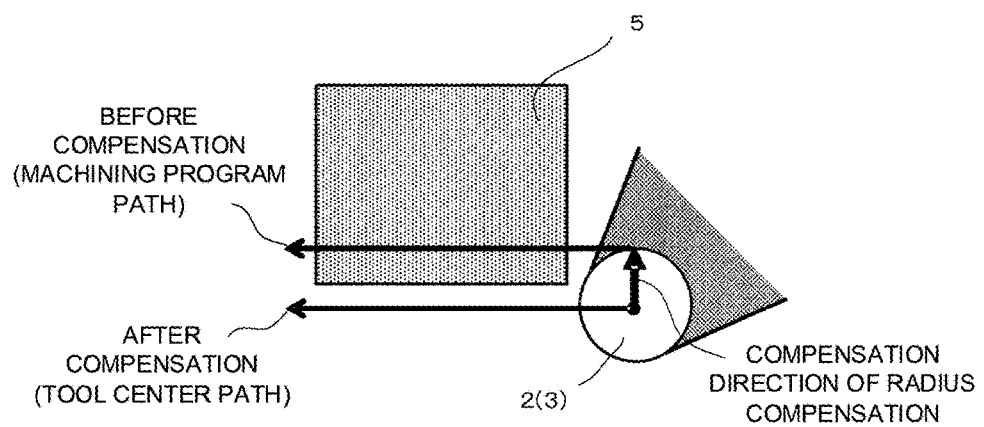
FIGS. 4A and 4B are diagrams illustrating a method for detecting abnormal interference between a blade portion of the turning tool and the workpiece.
Figure 4B:
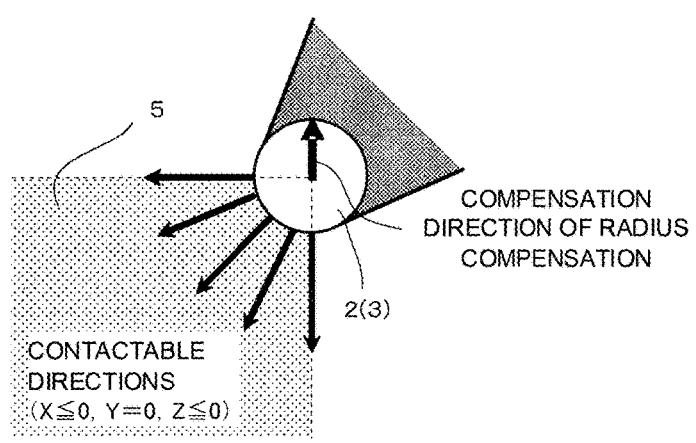

FIGS. 4A and 4B are schematic diagrams showing abnormal interference between the blade portion 3 of the turning tool 2 and the workpiece 5. If the contactable directions shown in FIG. 1A are set for the tool 2 of FIG. 4A, the compensation direction of radius compensation is not included in the contactable directions, as shown in FIG. 4B, so that the interference can be determined to be abnormal.

Figure 5A:
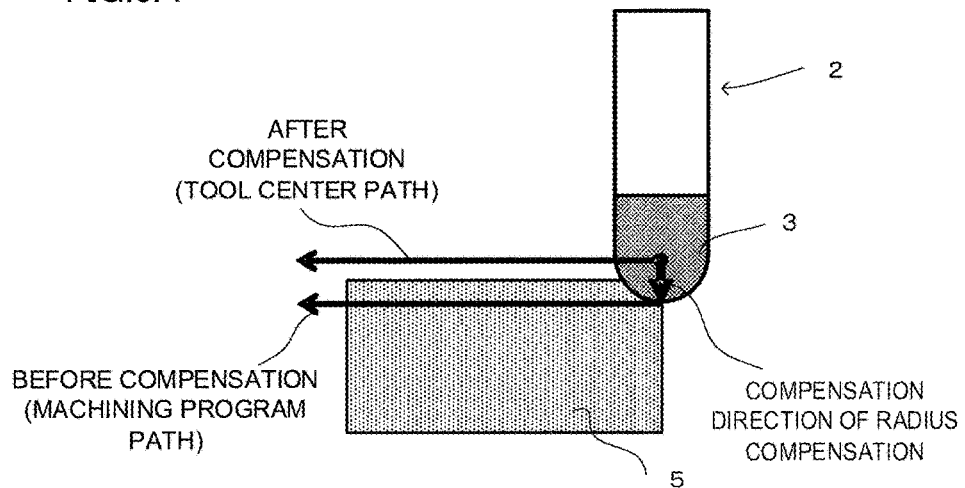
FIGS. 5A and 5B are diagrams illustrating a method for detecting abnormal interference between a blade portion of a milling tool and a workpiece.
Figure 5B:
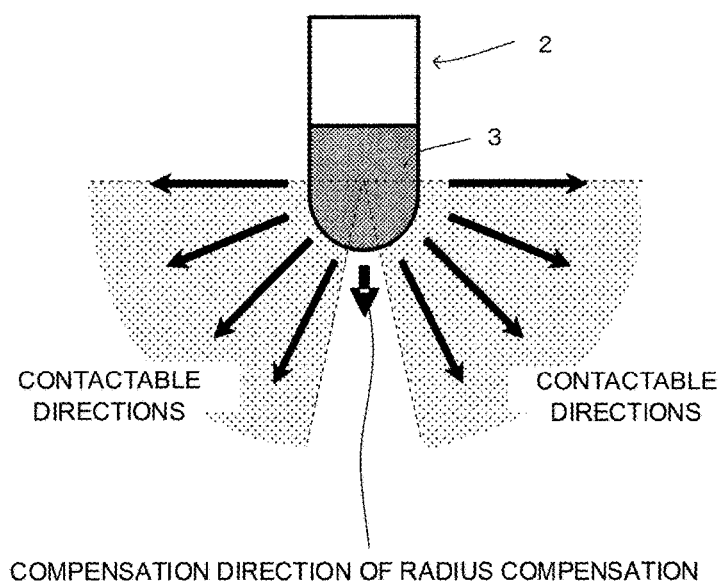

Further, FIGS. 5A and 5B are schematic diagrams showing abnormal interference between the blade portion 3 of the milling tool 2 and the workpiece 5 (interference between the workpiece 5 and the blade portion 3 with a peripheral speed of 0). If the contactable directions shown in FIG. 2A are set for the tool of FIG. 5A, the compensation direction of radius compensation is not included in the contactable directions, as shown in FIG. 5B, so that the interference can be determined to be abnormal.

Figure 6:
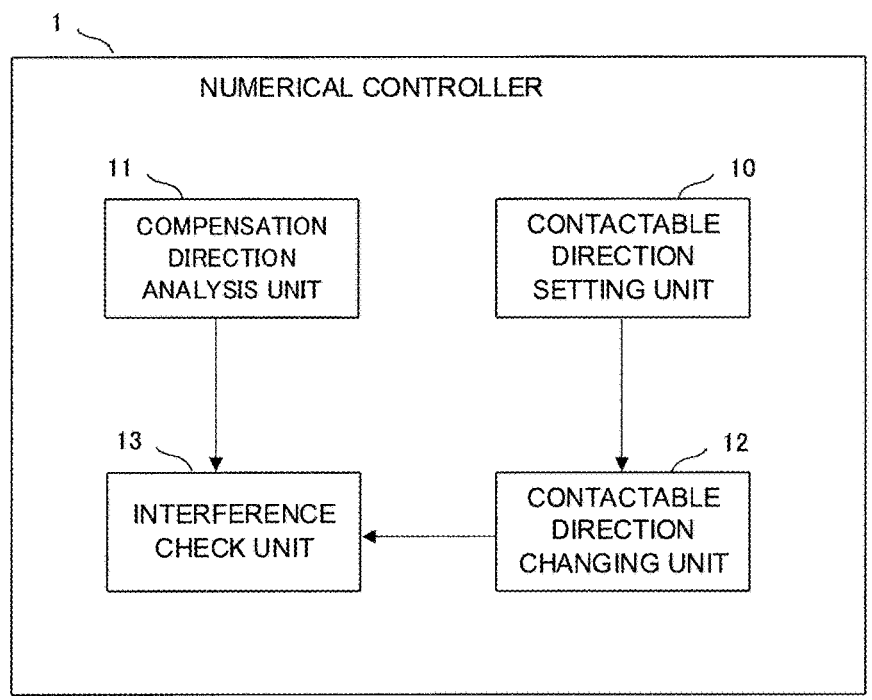
FIG. 6 is a functional block diagram of a numerical controller according to one embodiment of the present invention.
Figure 8A:
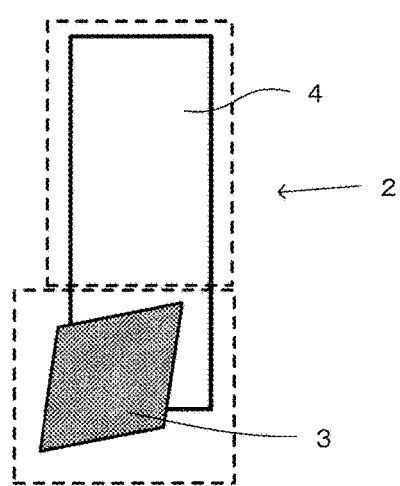
FIGS. 8A and 8B are diagrams illustrating configurations of tools (turning and milling tools)
Figure 8B:
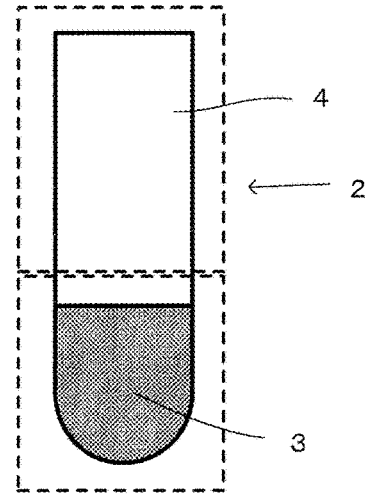
Figure 9A:
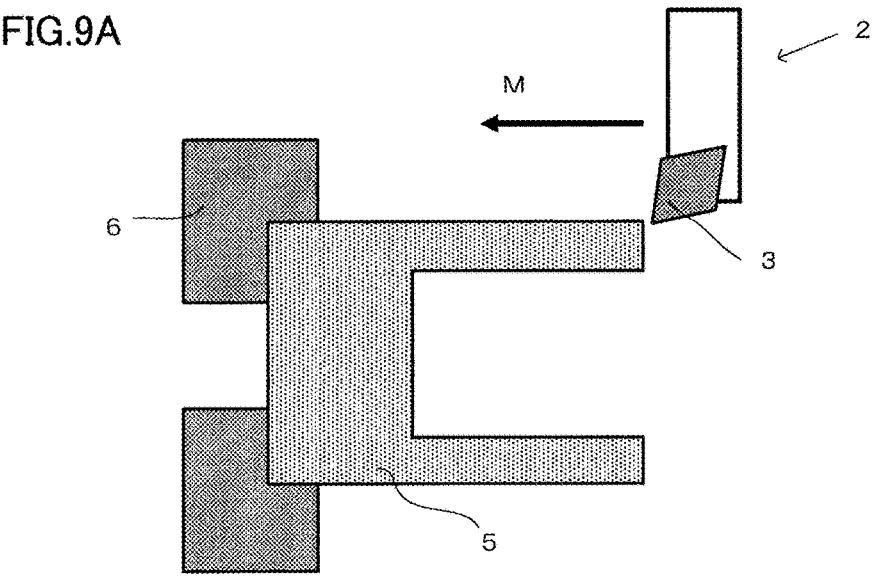
FIGS. 9A and 9B are diagrams illustrating abnormal interference between a tool and a workpiece in lathe turning.
Figure 9B:
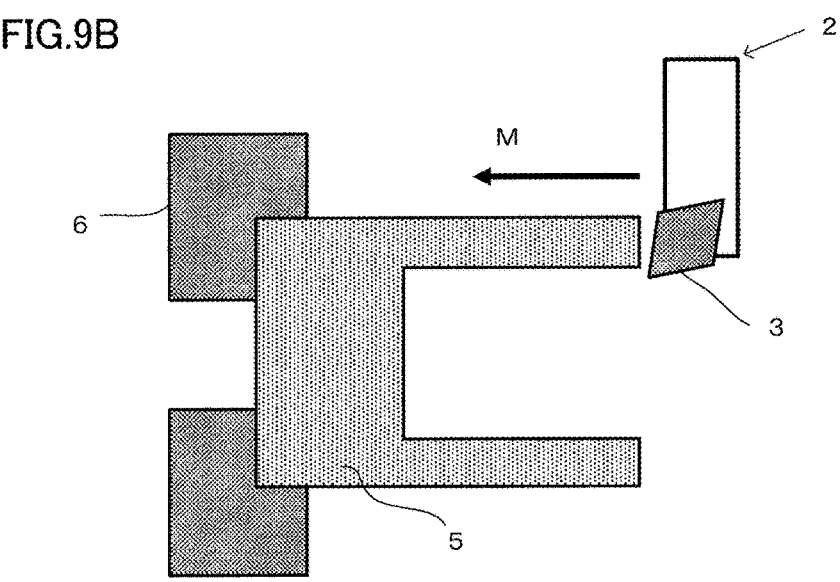
Figure 10:
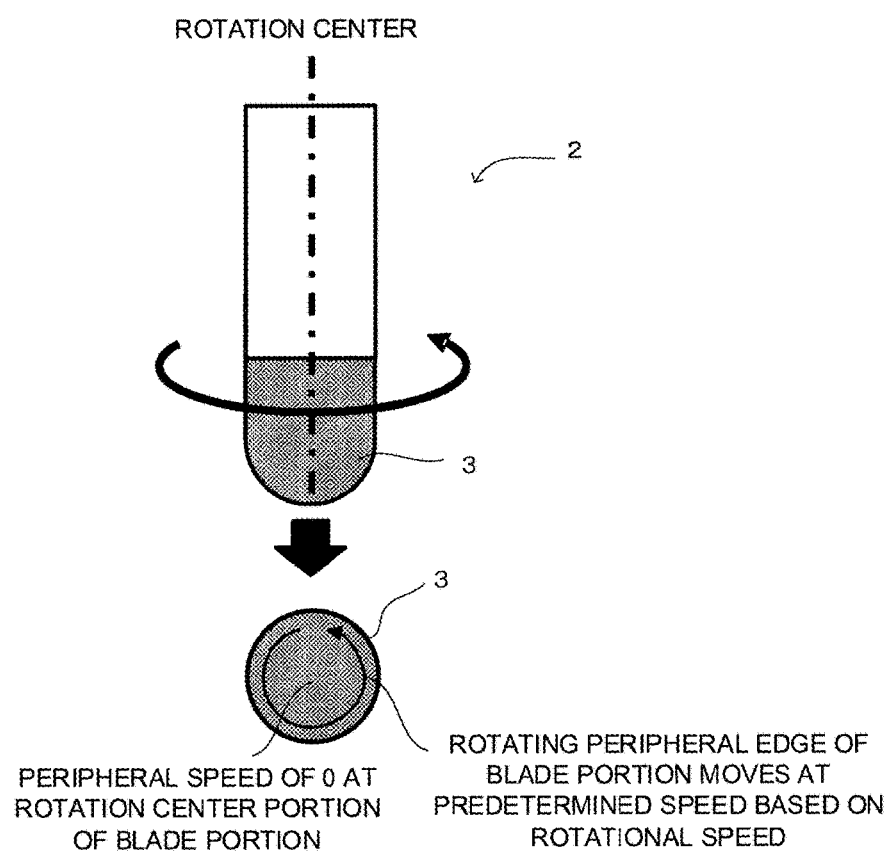
FIG. 10 is a diagram showing an area in which the peripheral speed of a blade portion of a milling tool is zero.
Figure 11A:
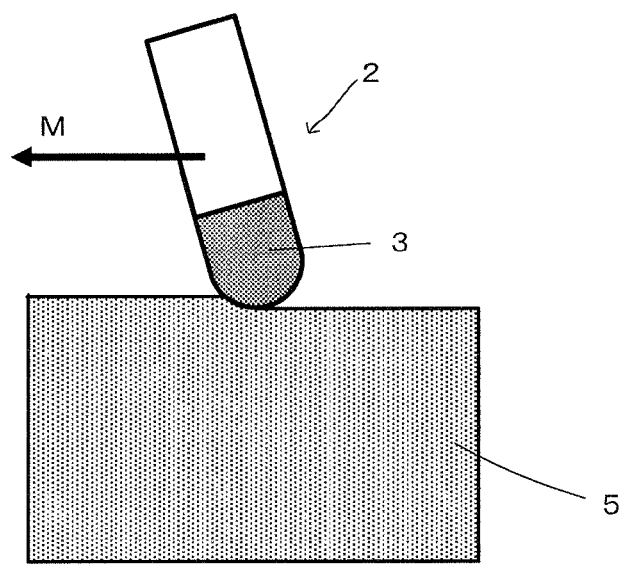
FIGS. 11A and 11B are diagrams illustrating abnormal interference between the milling tool and the workpiece.
Figure 11B:
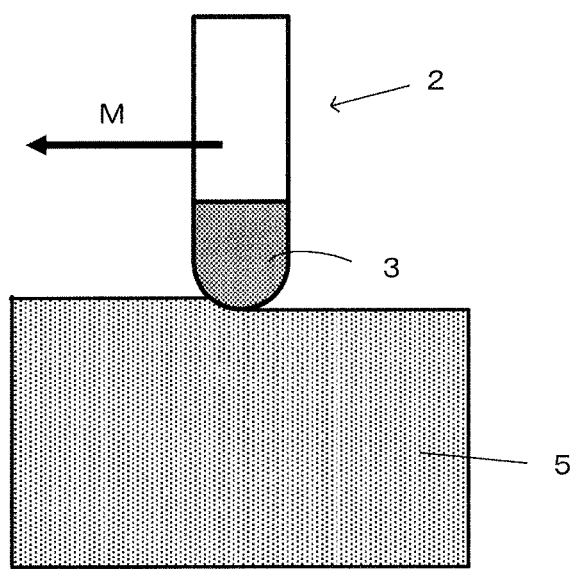

FIG. 6 is a functional block diagram of a numerical controller according to one embodiment of the present invention with the interference check function described above.

A numerical controller 1 comprises a contactable direction setting unit 10, compensation direction analysis unit 11, contactable direction changing unit 12, and interference check unit 13.

The contactable direction setting unit 10 is a function means for defining the contactable directions in which the blade portion of the tool used in the machining program to be analyzed can contact the workpiece. The contactable direction setting unit 10 may be a function means that accepts and stores definitions of contactable directions for individual tools used in the machining program, which are input by a user, or a function means that reads contactable directions previously defined for the respective tools from a memory, external device, or some other device on the network. Alternatively, moreover, the setting unit 10 may be a function means that combines both these functions. The contactable direction setting unit 10 outputs information on the contactable directions corresponding to the tools in response to commands from the contactable direction changing unit 12.

The compensation direction analysis unit 11 sequentially reads machining programs, first obtains the machining program path, and then compensates for the machining program path to obtain the tool center path in consideration of tool radius. Further, the compensation direction analysis unit 11 obtains the compensation direction of radius compensation that extends from the position after compensation (tool center path) to the position before compensation (machining program path) and delivers the obtained compensation direction to the interference check unit 13. The tool center path in consideration of tool radius is obtained by a conventional method known in the art. Since this method is a function attached to typical numerical controllers, a description thereof will be omitted herein.

The contactable direction changing unit 12 changes the contactable directions acquired from the contactable direction setting unit 10 so as to follow the posture of the tool mounted on the machine tool controlled based on the machining program and delivers the changed contactable directions to the interference check unit 13. The posture of the tool is obtained based on coordinate values of the axes of the machine tool (e.g., the position of a linear axis and the rotational angle of the rotation axis). By reorienting or rotating the contactable directions for the tool acquired from the contactable direction setting unit 10, on a three-dimensional space, based on the posture of the tool obtained in this manner, contactable directions that are changed so as to follow the posture of the tool are obtained.

If the compensation direction of radius compensation acquired from the compensation direction analysis unit 11 is not included in the contactable directions acquired from the contactable direction changing unit 12, the interference check unit 13 determines that an abnormal interference is generated between the tool and the workpiece. If determined that an abnormal interference is generated, the movements of axes are stopped to terminate machining or the determination result of interference is displayed on a display unit (not shown) or the like of the numerical controller 1. Further, detection of an abnormal interference based on the contactable directions and the compensation direction of radius compensation, which is proposed by the present invention, may be performed simultaneously with the conventional interference check based on the coordinate values of the axes of a machine tool and shape data on a workpiece, tool, jig, and the like stored in a memory (not shown).

FIG. 7 is a flowchart showing a flow of abnormal interference detection processing based on the contactable directions and the compensation direction of radius compensation, which is executed by the numerical controller 1 of FIG. 6.

[Step SA01] The compensation direction analysis unit 11 obtains the compensation direction of radius compensation based on the machining program.

[Step SA02] The contactable direction changing unit 12 obtains the current posture of the tool, based on the coordinate values of the axes of the machine tool, and obtains the contactable directions that are changed so as to follow the tool posture, based on the obtained current posture of the tool and the contactable directions for the tool acquired from the contactable direction setting unit 10.

[Step SA03] The interference check unit 13 determines whether or not the compensation direction of radius compensation obtained in Step SA01 is included in the contactable directions which is changed so as to follow the tool posture, obtained in Step SA02. If the compensation direction of radius compensation is included in the changed contactable directions, the processing proceeds to Step SA04. If not, the processing proceeds to Step SA05.

[Step SA04] The interference check unit 13 detects that interference between the tool and the workpiece is normal.

[Step SA05] The interference check unit 13 detects that interference between the tool and the workpiece is abnormal.

Thus, the numerical controller 1 of the present embodiment, which shares an interference check function with the prior art techniques, can detects an abnormal interference between the tool and the workpiece that could not be detected by the prior art techniques, by executing the abnormal interference detection processing based on the contactable directions and the compensation direction.

While an embodiment of the present invention has been described herein, the invention is not limited to the above-described embodiment and may be suitably modified and embodied in various forms.

The invention claimed is:

1. A numerical controller configured to detect abnormal interference between targets for interference check in a machine tool, including a tool and a workpiece, based on a machining program, the numerical controller comprising:
   non-transitory computer readable memory;
   one or more hardware processors coupled to the non-transitory memory and configured to read instructions from the non-transitory memory to cause the numerical controller to perform operations comprising:
   setting a contactable direction which is a direction in which the tool is allowed to contact the workpiece to machine the workpiece;
   analyzing the machining program to obtain a compensation direction of radius compensation;
   changing the contactable direction for the tool based on a posture of the tool;
   executing an interference check process for detecting an abnormal interference between the tool and the workpiece, based on the obtained compensation direction of radius compensation and the changed contactable direction, wherein the interference check process determines that the interference between the tool and the workpiece is abnormal if the compensation direction of radius compensation is not included in the changed contactable direction for the tool; and terminating machining by the machine tool if an abnormal interference is detected.

2. The numerical controller according to claim 1, wherein the contactable direction is set for each type of tool.

\* \* \* \* \*